United States Patent [19]

Olsson

[11] 4,297,171
[45] Oct. 27, 1981

[54] NUCLEAR REACTOR FUEL ASSEMBLY
[75] Inventor: Torsten Olsson, Vesteras, Sweden
[73] Assignee: AB ASEA-ATOM, Sweden
[21] Appl. No.: 83,488
[22] Filed: Oct. 10, 1979
[30] Foreign Application Priority Data
  Oct. 13, 1978 [SE] Sweden .............................. 7810686
[51] Int. Cl.³ ............................................. G21C 3/30
[52] U.S. Cl. .................................... 376/440; 376/452
[58] Field of Search ............................ 176/76, 78, 79
[56] References Cited
  U.S. PATENT DOCUMENTS 3,166,481  1/1965  Braun ..................................... 176/78
  3,182,003  5/1965  Thorp ..................................... 176/78
  3,607,639  9/1971  Santen .................................... 176/78
  3,966,550  6/1976  Foulds .................................... 176/78
  4,059,484 11/1977  Bupp ...................................... 176/78
  4,190,494  2/1980  Olsson .................................... 176/78

Primary Examiner—Donald P. Walsh
Attorney, Agent, or Firm—Pollock, Vande Sande & Priddy

[57] ABSTRACT

A fuel assembly is disclosed in which the nuclear fuel rods are supported by a grid-shaped bottom plate and a similar top plate, each of which is welded together from thin vertical metal strips, for example of a thickness of 0.6 mm, to define a grid of vertical channels (13, 14) intended for the fuel rods, each vertical channel being surrounded by eight adjacent channels only intended for coolant. (FIG. 2.)

6 Claims, 10 Drawing Figures

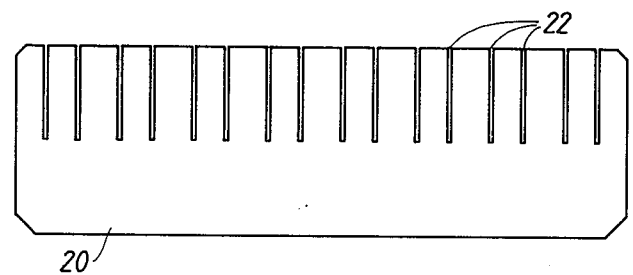
FIG. 4a
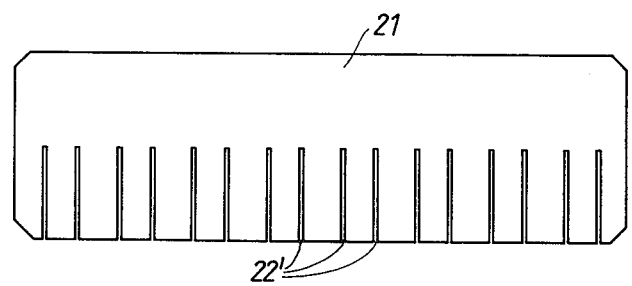
FIG. 4b
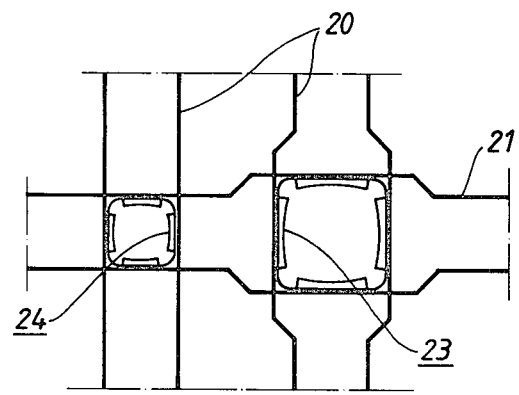
FIG. 5
FIG. 8  FIG. 6  FIG. 9  FIG. 7
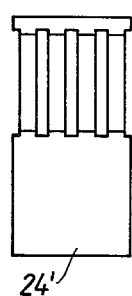 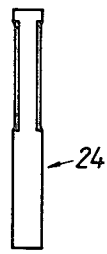 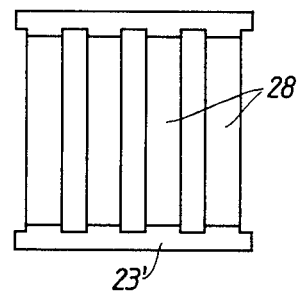 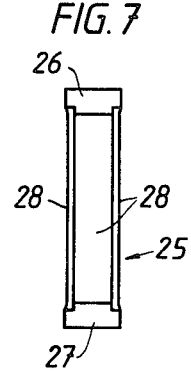

1

NUCLEAR REACTOR FUEL ASSEMBLY

TECHNICAL FIELD AND BACKGROUND ART

The present invention relates to a fuel assembly for nuclear reactors, and particularly to the general type comprising a box-like housing with upper and lower grids therein for supporting elongated fuel rods in such a manner as to define coolant flow channels thereamong. A fuel assembly of this kind is disclosed in U.S. Pat. No. 3,697,375, in which fuel rods are supported in grid channels formed with circular-cylindrical cross section and each circular grid channel is surrounded by four adjacent coolant channels.

DISCLOSURE OF INVENTION

In a fuel assembly according to the invention, the upper, lower or both grids are manufactured in a far simpler manner than that used for prior art grids. This simplification is achieved for a given number of fuel rods by defining the coolant channels surrounding the fuel rods by means of a greater number of walls, whereby a relatively thin sheet material may be used as wall material to assemble a grid of "egg crate" configuration. Drilling is avoided and the entire grid may be constructed by welding together thin sheet elements or thin-walled profiles, while using welding methods which are well suited for automatization. According to another embodiment of the invention, grid channels intended for receiving fuel rods are provided with spring inserts, thus permitting greater tolerances when manufacturing the grid.

BRIEF DESCRIPTION OF THE DRAWINGS

The invention will be described with reference to the accompanying schematic drawings, in which:

FIGS. 4a and 4b show two sheet elements which, when assembled, cross each other and, together with a plurality of similar elements, for a bottom grid according to the invention;

FIG. 5 shows a detail of the grid shown in FIG. 2, each of the fuel rod-enclosing channels of the grid being provided with a spring insert;

FIGS. 6 and 7 show side views of two different spring inserts; and

FIGS. 8 and 9 show punched sheet billets for the two spring inserts.

BEST MODE FOR CARRYING OUT THE INVENTION

Figure 1:
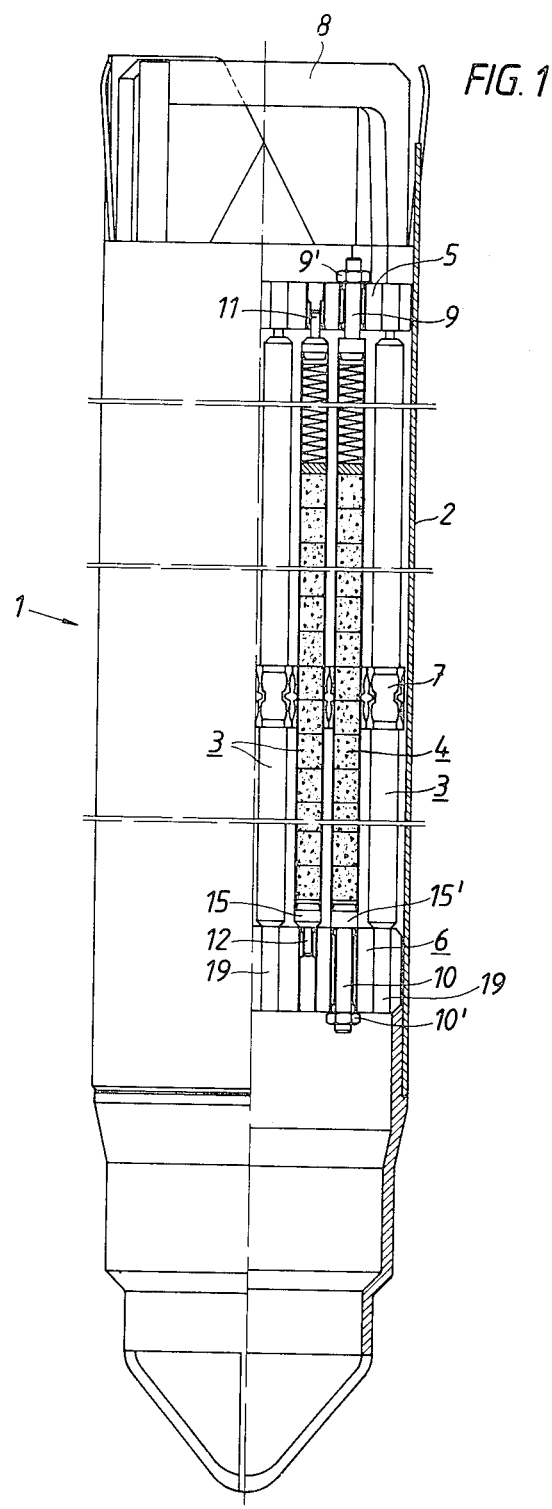
FIG. 1 shows a partial vertical section of a fuel assembly according to the invention.

In the drawings, a fuel assembly 1 is seen to comprise a box 2 surrounding a plurality of fuel rods 3 and 4, which are positioned within box 2 by means of a top grid 5, a bottom grid 6 and a plurality of spacers 7 arranged between the grids. Bottom grid 6 sits with its outer edge against an upwardly-facing surfce 6' formed on the inside of box 2. Top grid 5 is provided with a handle 8. Fuel rods 4, which are four in number, are each provided with an upper end plug 9 and a lower end plug 10. Fuel rods 3 are each provided with an upper end plug 11 and a lower end plug 12. End plugs 9 and 10, which are included in each fuel rod 4, are longer and thicker than the end plugs 11 and 12. Each is provided with a nut 9' and 10' above the top grid and below the bottom grid, respectively, so that fuel rods 4 also serve as tie rods between grids 5 and 6. Each end plug 9 and 10 passes through a vertical, prismatic channel 13 with a square cross section, in top grid 5 and bottom grid 6, respectively; and end plugs 11 and 12 are each arranged in a vertical, prismatic channel 14 with a smaller square cross section. Each end plug has a relatively thick portion, located nearest the fuel, which is designated 15' in rods 4, and 15 in rods 3. Downwardly-facing surfaces of end plug portions 15 and 15' make contact with upwardly-facing surfaces of bottom grid 6. Each of channels 13 is surrounded by eight adjacent, vertical, prismatic channels, which are not occupied by fuel rods, but only traversed by coolant, namely a channel 16 at each side and a channel 17 at each corner. Similarly, each channel 14 is surrounded by eight adjacent channels, intended for coolant only, namely four channels 18 and four channels 19. It is evident that it is possible, although not convenient, to insert additional vertical walls, thereby increasing the number of water-filled channels adjacent to a channel 13 or a channel 14 and to use other than square channels. Such arrangements are considered to be within the scope of the invention.

Figure 2:
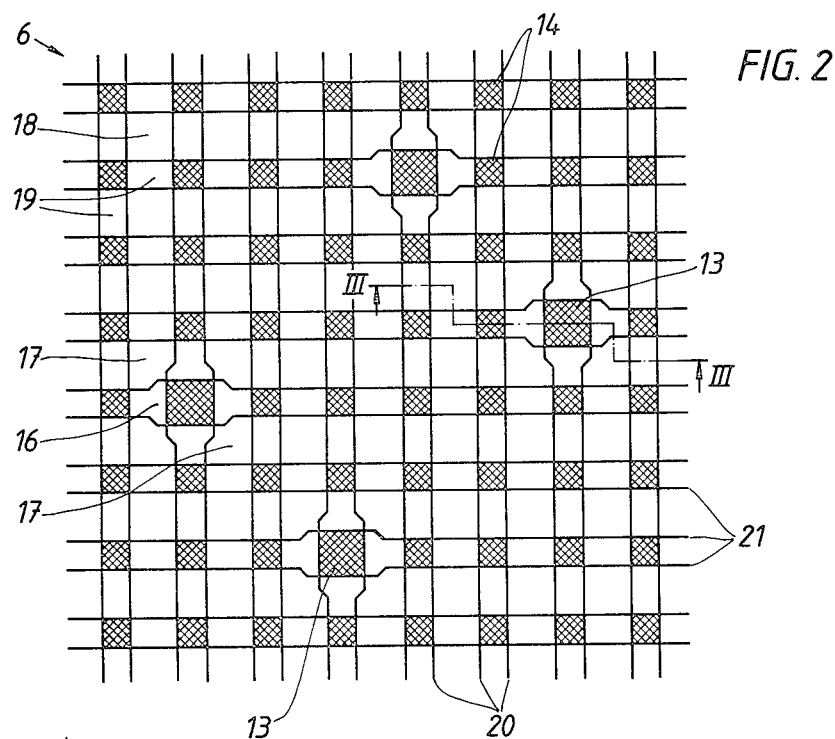
FIG. 2 shows a plan view of a bottom grid included in the fuel assembly, the intended positions of the fuel rods being marked with crosshatching.
Figure 3:
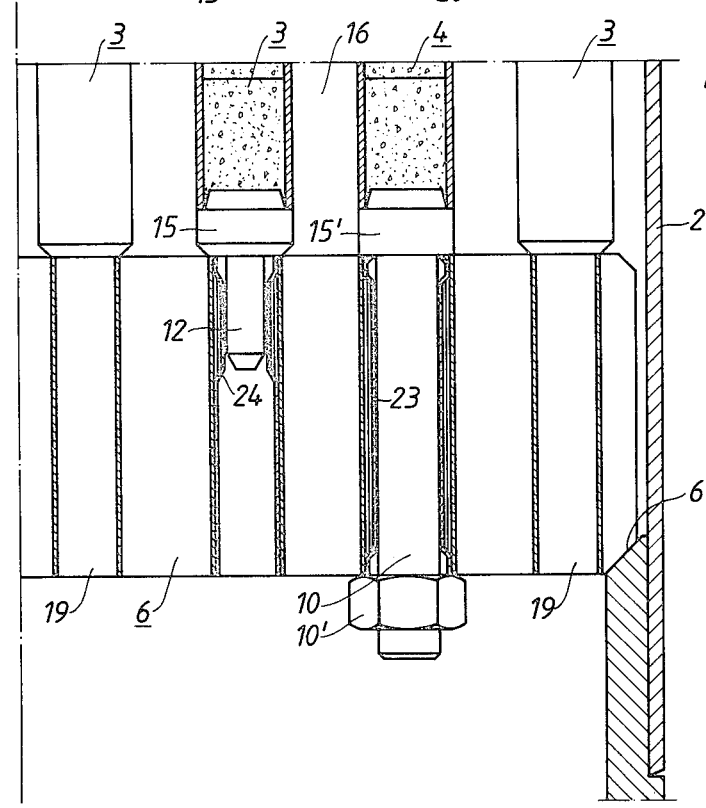
FIG. 3 shows a detail of FIG. 1 taken along line III—III of FIG. 2.

Each of grids 5 and 6 is assembled from a plurality of vertical sheet elements 20, which intersect a number of similar sheet elements 21 at right angles. Sheet elements 20 and 21 have a thickness which is below 1.5 mm, preferably below 1 mm, and are provided with a plurality of vertical slots 22 and 22', respectively, the widths of which are equal to the thickness of the sheet and the heights of which are equal to about one half the total height of the element. The lower, non-slotted halves of the sheet elements 20 are fitted into the slots of sheet elements 21, and the upper non-slotted halves of element 21 are fitted into the slots of elements 20, to form a grid of "egg crate" configuration. Elements 20 and 21 then are welded to each other at all junctions or at least at a predominant number of junctions. The larger cross section of channels 13 is defined by providing bulging portions in sheet elements 20 and 21, as illustrated in FIGS. 2 and 5, at the locations required for rods 4.

As is shown in FIG. 5, channels 13 and 14 in bottom grid 6 are provided with resilient spring inserts 23 and 24, respectively. The spring inserts are welded to bottom grid 6. Each spring insert 23 comprises an upper and a lower square frame 26 and 27 of thin sheet metal making contact with the channel walls, each side of the upper frame being connected to a corresponding side of the lower frame by means of an elongated leaf spring portion 28, which, at each end, is turned inwardly towards the center of the channel so that the minimum width of the channel is less than the maximum thickness of the associated end plug. Spring portion 28 is in contact with the cylindrical surface of the portion of the fuel rod 4 located in channel 13. The spring force exerted may amount to 40 N and the spring constant is relatively high, about 400 N/mm at the most, the elastic deformation for each spring thus being about 0.1 mm. After one or two years of operation, the relaxation of the spring portion 28 probably has gone so far that no clamping force is exerted on the fuel rod. However, the spring insert still gives a favorable effect, namely a hydraulic damping of the rod, which is due to the formation of a thin water layer between each spring portion 28 and the portion of the fuel rod 4 located in channel 13. The differences between spring insert 24 and the above-described insert 23 are that insert 24 is smaller in cross section and the lower square frame of insert 24 is made with much greater height than the upper frame. If the grid shown in FIG. 2 is manufactured with great accuracy, the spring inserts may be dispensed with.

INDUSTRIAL APPLICABLILITY

The fuel assembly according to the present invention is suited for use in conventional boiling water nuclear reactors; however, it may also be used to advantage in pressurized water reactors and in reactors using other coolant systems.

Having disclosed my invention in sufficient detail to enable those skilled in the art to make and use it, I claim:

1. A nuclear reactor fuel assembly, comprising:
an elongated box;
a plurality of fuel rods vertically disposed within said box, said fuel rods each comprising an upper and lower end plug; and
upper and lower grid means disposed within said box for supporting said fuel rods, at least one of said grid means comprising a plurality of prismatic, vertical channels, each one of a first portion of said channels being occupied by an end plug of one said fuel rods, the minimum width of the channels of said first portion being less than the maximum thickness of the associated fuel rod, and a second portion of said channels being open in order to function as coolant channels and further being distributed among the first portion so that each channel of said first portion is surrounded by at least eight adjacent coolant channels of said second portion.

2. A nuclear reactor fuel assembly according to claim 1, further comprising resilient means disposed within each one of said first portion of said channels for contacting and restraining the associated end plug of one of said fuel rods.

3. A nuclear reactor fuel assembly according to claim 2, wherein said resilient means comprises a plurality of vertical leaf spring portions, each of said spring portions being disposed at corresponding wall of its channel in position to contact the end plug of the fuel rod.

4. A nuclear fuel reactor assembly according to claim 1, wherein at least one of said grid means comprises a plurality of intersecting sheet elements arranged in vertical planes and joined to each other, each of said sheet elements being provided with a plurality of vertical slots extending from an unslotted portion of the element, a first portin of said sheet elements being arranged to intersect a second portion of said sheet elements an an angle in such a manner that the unslotted portions of said first portion are fitted into the slots of said second portion and the unslotted portions of said second portion are fitted into the slots of said first portion.

5. A nuclear reactor fuel assembly according to claim 4, wherein said first portion of said sheet elements intersects said second portion of said sheet elements at a right angle.

6. A nuclear reactor fuel assembly according to claim 4, wherein some of said fuel rods have thicker end plugs than the others, said sheet elements being provided with bulging portions to define enlarged channels to accommodate said thicker end plugs.

* * * * *